United States Patent
Hirai

(10) Patent No.: US 7,829,835 B2
(45) Date of Patent: Nov. 9, 2010

(54) PROJECTION TYPE IMAGE DISPLAY APPARATUS HAVING A PROJECTION LENS AND A PHOTOGRAPHING LENS MOVABLE BY A SAME DRIVE SECTION

(75) Inventor: Shinichi Hirai, Daito (JP)

(73) Assignee: Funai Electric Co., Ltd., Daito-shi (JP)

(*) Notice: Subject to any disclaimer, the term of this patent is extended or adjusted under 35 U.S.C. 154(b) by 405 days.

(21) Appl. No.: 12/124,795

(22) Filed: May 21, 2008

(65) Prior Publication Data

US 2008/0292305 A1 Nov. 27, 2008

(30) Foreign Application Priority Data

May 22, 2007 (JP) .............................. 2007-135555

(51) Int. Cl.
*H01L 27/00* (2006.01)
(52) U.S. Cl. ................... 250/208.1; 250/201.2
(58) Field of Classification Search ............. 250/208.1, 250/201.1–201.4, 214 R; 353/101, 69, 70, 353/76; 345/214
See application file for complete search history.

(56) References Cited

U.S. PATENT DOCUMENTS 7,494,229 B2 * 2/2009 Miyasaka ................... 353/101

FOREIGN PATENT DOCUMENTS

| JP | 2003-15218 | | 1/2003 |
| JP | 2005-241713 | A | 9/2005 |
| JP | 2006-98789 | A | 4/2006 |

* cited by examiner

*Primary Examiner*—Que T Le
(74) *Attorney, Agent, or Firm*—Crowell & Moring LLP

(57) ABSTRACT

Disclosed is a projection type image display apparatus including a projection section to output a projection light in which an image is attached through a projector lens and a photographing section to photograph a projected image projected by the projection section through a photographing lens, and the projected image which is projected on a screen by the projection section is obtained by the photographing section and a focus of the projected image is adjusted based on a photographing result of the image obtained by the photographing section, and the projector lens and the photographing lens are movable in a direction to change the focus of the projected image or a focus of the photographed image by a same drive section.

5 Claims, 6 Drawing Sheets

PROJECTION TYPE IMAGE DISPLAY APPARATUS HAVING A PROJECTION LENS AND A PHOTOGRAPHING LENS MOVABLE BY A SAME DRIVE SECTION

BACKGROUND OF THE INVENTION

1. Field of the Invention

The present invention relates to a projection type image display apparatus provided with a photographing section capable of photographing a projected image projected on a screen through a projector lens to adjust the focus of the projected image by using the photographing section.

2. Description of Related Art

Conventionally, there is known a projection type projector which modulates a light emitted from a light source by an image projecting device, such as the DMD or the like, and which projects the modulated light onto a screen through an optical lens (projector lens) to display an image and the like. Moreover, in the projection type projector, because it is troublesome for a user to manually adjust the focus of a projected image, the so-called autofocus function for automatically adjusting the focus of a projected image is known.

In order to realize the autofocus function, a projection type projector equipped with a photographing section (for example, an image sensor of the CCD camera or the like) capable of photographing a projected image projected on a screen through a projector lens besides a projection section including a projector lens is proposed. For example, as shown in FIG. 6, there is a projection type projector that takes in a mark image TM projected on a screen through a projector lens L1 through a photographing lens L2, and that displaces the position of the projector lens L1 on the basis of the photographed image to automatically adjust the focus of the projected image (mark image).

Moreover, the following technique is disclosed as related art pertaining to the present invention.

For example, JP2006-098789A discloses a projection apparatus that simplifies troublesome setting operations at any projection position to easily project an image having an appropriate size and a shape. Particularly, the projection apparatus comprises a projection section to perform a projection display according to an input image signal, a photographing section to carry out the photographing in the projection direction of the projection section, an extraction section to extract the positions of a plurality of point marks indicating a projection range in the image obtained by the photographing section and a projection control section to variably set the projection range in the projection section in correspondence with the positions of the point marks obtained by the extraction section.

Moreover, for example, JP2005-241713A discloses a manufacturing method of an optical apparatus capable of accurately knowing a basic position of a light flux detection apparatus (for example, the CCD camera or the like) and a projector equipped with an optical apparatus manufactured by the manufacturing method. The optical apparatus enables to determine the accurate location of the basic position of the CCD camera as the light flux detection apparatus.

Moreover, for example, JP2003-015218A discloses a projection type display apparatus that simplifies the position adjustment and the like between an image projection section and a photographing section and that does not cause any parallax between a projected image and a photographed image. Particularly, the projection type display apparatus is equipped with the image projection section and the photographing section to photograph a projection surface and a subject situated on the projection surface, and allows a projection light to be output from the image projection section and a reflected light to enter the projection section from the projection surface or the subject through the same opening portion by a spectral section.

In the techniques disclosed in JP2006-098789A, JP2005-241713A, and JP2003-015218A, the projector lens constituting the projection section and the photographing lens constituting the photographing section are separately provided, and the respective lenses are connected to separate drive sections. That is, the respective lens positions can be adjusted independently, and the focus of the projected image and the photographed image can be adjusted separately. As described above, when the projector lens and the photographing lens are driven by respectively different drive sections, the accuracy of the drive sections is not necessarily the same. Therefore, even when the position of the projector lens is adjusted on the basis of the photographing result by the photographing section, for example, even when the moving amount of the projector lens is adjusted in conjunction with the moving amount of the photographing lens, errors are produced in no small quantities.

Moreover, there is also a case where the focus of a photographed image can be regarded as being adjusted by using a photographing lens having a large depth of field even when the position of the photographing lens is not particularly adjusted by the drive section. In this case, it is considered that the necessity of independently providing a drive section for the position adjustment of the photographing lens is low.

SUMMARY OF THE INVENTION

It is therefore, a main object of the present invention to provide a technique capable of improving the accuracy of focus adjustment and simplifying the apparatus configuration in a projection type projector equipped with a photographing section capable of photographing a projected image projected on a screen through a projector lens to adjust the focus of the projected image by using the photographing section.

According to a first aspect of the present invention, there is provided a projection type image display apparatus comprising a projection section to output a projection light in which an image is attached through a projector lens and a photographing section to photograph a projected image projected by the projection section through a photographing lens, and the projected image which is projected on a screen by the projection section is obtained by the photographing section and a focus of the projected image is adjusted based on a photographing result of the image obtained by the photographing section and the projector lens and the photographing lens are movable in a direction to change the focus of the projected image or a focus of the photographed image by a same drive section.

According to a second aspect of the present invention, there is provided a projection type image display apparatus comprising a projection section to output a projection light in which an image is attached through a projector lens, a photographing section to photograph a projected image projected by the projection section through a photographing lens, a control section to control the photographing section so as to obtain the projected image on a screen which is projected by the projection section, and the control section adjusts a focus of the projected image based on a photographing result of the image obtained by the photographing section and a drive section which can move the projector lens and the photographing lens in a direction to change the focus of the projected image or a focus of the photographed image, and the projector lens and the photographing lens are arranged in a same frame body to constitute a lens member for projecting and photographing the image and the control section controls the projection section so as to project a mark image which is set in advance on the screen and controls the photographing section so as to photograph a projected image of the mark image, and the control section operates the drive section to adjust a focus of the projected image so that the photographed mark image is in focus.

BRIEF DESCRIPTION OF THE DRAWINGS

The above and other objects, advantages and features or the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described with reference to the drawings.

Figure 1:
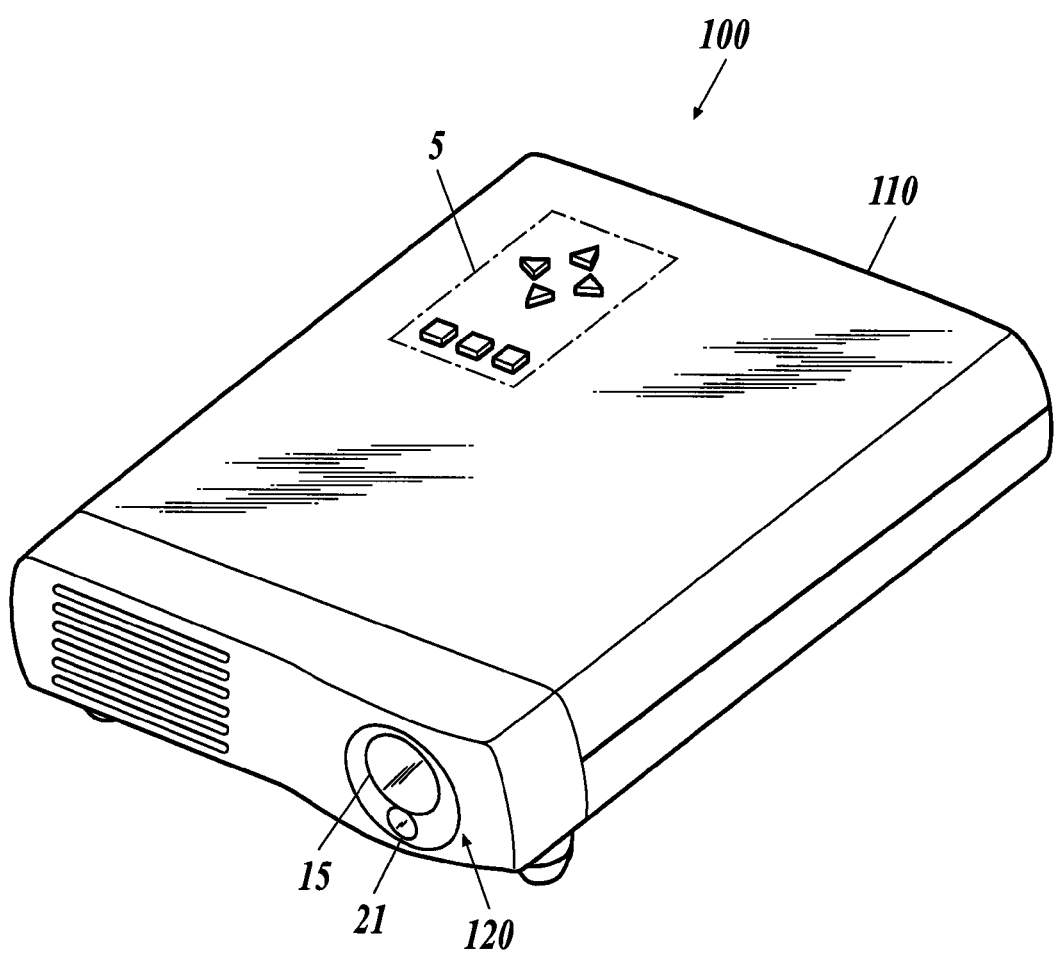
FIG. 1 is a perspective view of the external appearance of a projection type projector according to an embodiment of the present invention.

FIG. 1 is a perspective view of the external appearance of a projection type projector according to an embodiment of the present invention.

As shown in FIG. 1, in a projection type projector 100 according to the embodiment, a projecting and photographing lens member 120 in which a projector lens 15 and a photographing lens 21 are integrally formed and disposed are arranged on the right side in the front face of a body case 110 shaped in a rectangular parallelepiped shape. A photographing lens 21 is joined to the lower part of the projector lens 15 to form one lens in the projecting and photographing lens member 120.

The projector lens 15 projects a light figure formed by a light modulation element such as the after mentioned DMD to an object such as a screen, and can arbitrarily change the focus position (lens position).

The photographing lens 21 photographs a projected image projected by the projector lens 15, and can arbitrarily change the focus position (lens position) in a similar way as the projector lens 15. Here, in the embodiment, a photographing lens having a sufficiently large depth of focus (depth of field) is used so that the photographing lens 21 may be in focus onto the projected image (screen surface) even when the lens position of the photographing lens 21 is changed.

In the conventional projection type projector, a projector lens and a photographing lens are separately provided, and the respective lenses are connected to separate drive sections. On the other hand, in the embodiment, the projector lens 15 and the photographing lens 21 are integrally formed, and the embodiment is different from the convention projection type projector in that the moving amount of both the projector lens 15 and the photographing lens 21 are adjusted by a focus drive motor 3 as the after mentioned drive section.

That is, in the present embodiment, because the projector lens 15 and the photographing lens 21 are displaced by the same drive section, the occurrence of errors when the moving amount of either one of the projector lens 15 and the photographing lens 21 is controlled by the moving amount of the other of the projector lens 15 and the photographing lens 21 can be suppressed. Moreover, because the number of parts of the focus drive motor decreases in comparison with that of the conventional projection type projector, the present invention can contributes to the miniaturization of the apparatus and to the reduction of the manufacturing cost thereof.

Moreover, an operation section 5 equipped with various types of operation keys is provided on the upper surface of the body case 110, and an image input and output terminal and an AC adapter connection section which are not shown in the drawing are provided on the back surface of the body case 110.

Figure 2:
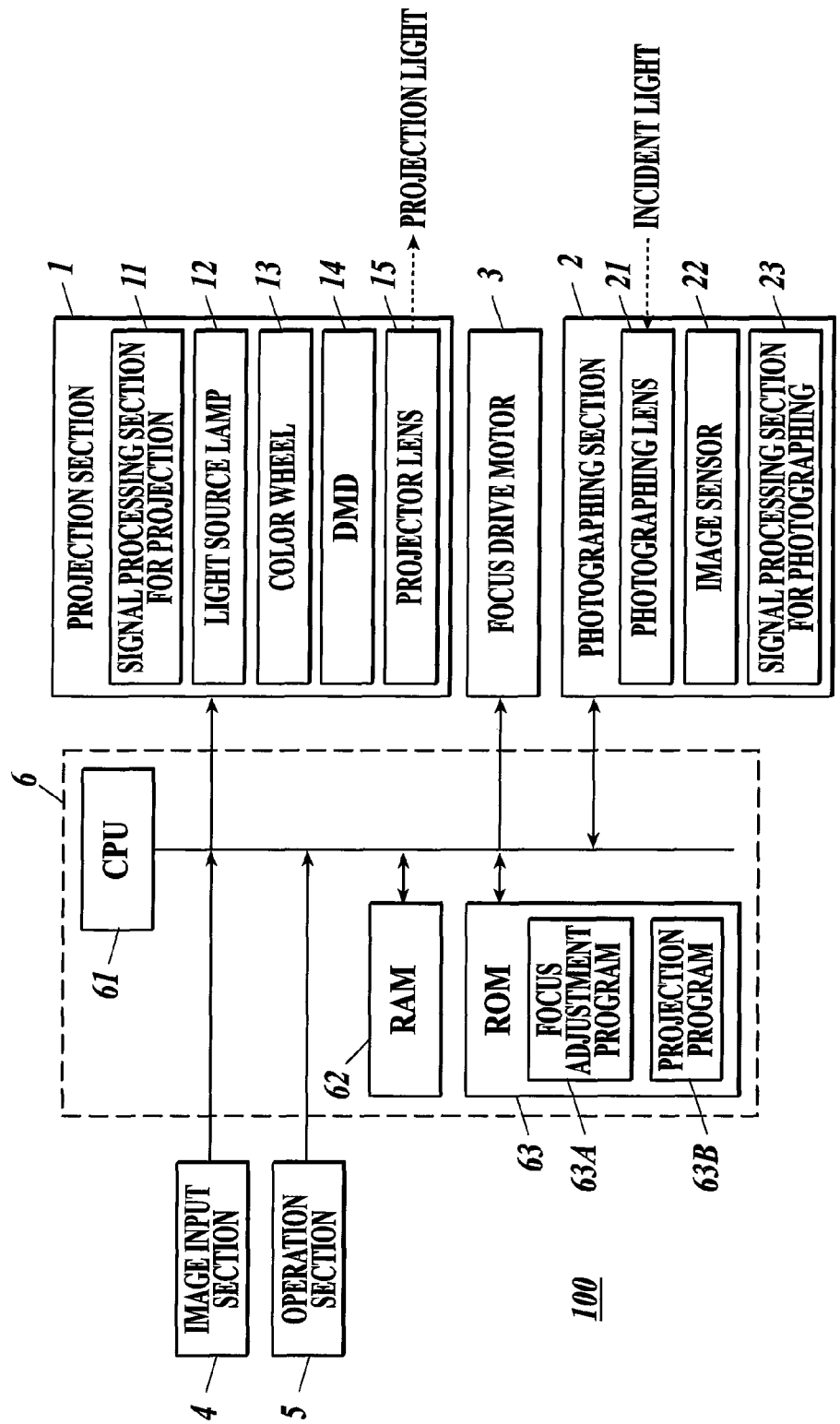
FIG. 2 is a block diagram showing the schematic configuration of a projection type projector of the embodiment.

FIG. 2 is a block diagram showing the schematic configuration of the projection type projector 100 of the embodiment.

The projection type projector 100 of the embodiment is an apparatus to project a light in which an image is attached onto a screen to perform image display, and comprises a projection section 1, a photographing section 2, the focus drive motor 3, an image input section 4, the operation section 5, and a control section 6.

The projection section 1 as a projection unit comprises a signal processing section 11 for projection, a light source lamp 12, a color wheel 13, the DMD (digital micromirror device) 14, and the projector lens 15.

Particularly, the signal processing section 11 for projection generates an image signal for projecting on the basis of image data from the image input section 4. The light source lamp 12 is a light source lamp such as a metal halide lamp, an extra-high pressure mercury lamp, an incandescent lamp, a halogen lamp and the like, and is preferably a light source lamp having higher luminance and higher efficiency. The color wheel 13 is a rotating type divided color filter to change a projection light from the light source lamp 12 into any one of the monochromatic lights of R (red), G (green) and B (blue). A synchronous circuit which is not shown in the drawing is connected to the color wheel 13, and the color wheel 13 is controlled to rotate by the synchronous circuit. The DMD 14 is an optical unit in an approximately rectangular shape equipped with an IC (integrated circuit) which is paved with hundreds of thousands to several millions of micromirrors, for example, and reflects light by a dot unit on the basis of the image data from the image input section 4 to generate the projection light in which an image is attached. The projector lens 15 projects the light (optical image) modulated by the DMD 14 on the screen so that the image is enlarged.

That is, in the projection section 1, a light radiated from the light source lamp 12 is changed to any one of the monochromatic lights of R, G and B by the color wheel 13, and the monochromatic light is modulated by the DMD 14. Then, the modulated optical image is projected onto the screen by the projector lens 15 so that the image is enlarged.

The photographing section 2 as a photographing unit comprises the photographing lens 21, an image sensor 22, and a signal processing section 23 for photographing.

Particularly, the photographing lens 21 takes in a projected image projected on the screen by the projection section 1. The image sensor 22 is composed of an image pickup device such as the CCD (charge coupled device), and picks up the image which is taken in by the photographing lens 21. The signal processing section 23 for photographing digitizes an analog image signal output from the image sensor 22 to generate image data.

That is, in the photographing section 2, an image based on an incident light which is taken in through the photographing lens 21 is picked up by the image sensor 22, and the image is changed to data form by the signal processing section 23 for photographing.

The focus drive motor 3 displaces the lens member 120 including the projector lens 15 and the photographing lens 21 to adjust the focus of a projected image or a photographed image (focus adjustment).

The image input section 4 is electrically connected to an image output equipment such as a personal computer or the like, and performs the signal processing of inputting the image data of the image to be projected onto the screen. The operation section 5 includes a plurality of operation keys relating to the turning on/off of an apparatus power source and to the projection processing of an image, and enables a user to input an operation command.

For example, the control section 6 comprises a CPU (central processing unit) 61, a RAM (random access memory) 62 and a ROM (read only memory) 63, and controls each section of the projection type projector 100.

The CPU 61 reads the processing program and the like stored in the ROM 63 and expands the read processing program and the like in the RAM 62 to execute the program. The CPU 61 thereby controls the entire projection type projector 100.

The RAM 62 expands the processing programs and the like which is executed by the CPU 61 in the program storage region in the RAM 62, and stores the input data, the processing results generated at the time of the execution of the above processing program and the like in the data storage region in the RAM 62.

For example, the ROM 63 is composed of a semiconductor memory, and the processing program, data and the like are stored in advance. For example, the ROM 63 stores a focus adjustment program 63A to adjust the focus of the projected image, a projection program 63B to project the image based on the image data input from the image input section 4 onto the screen and the like.

Figure 3:
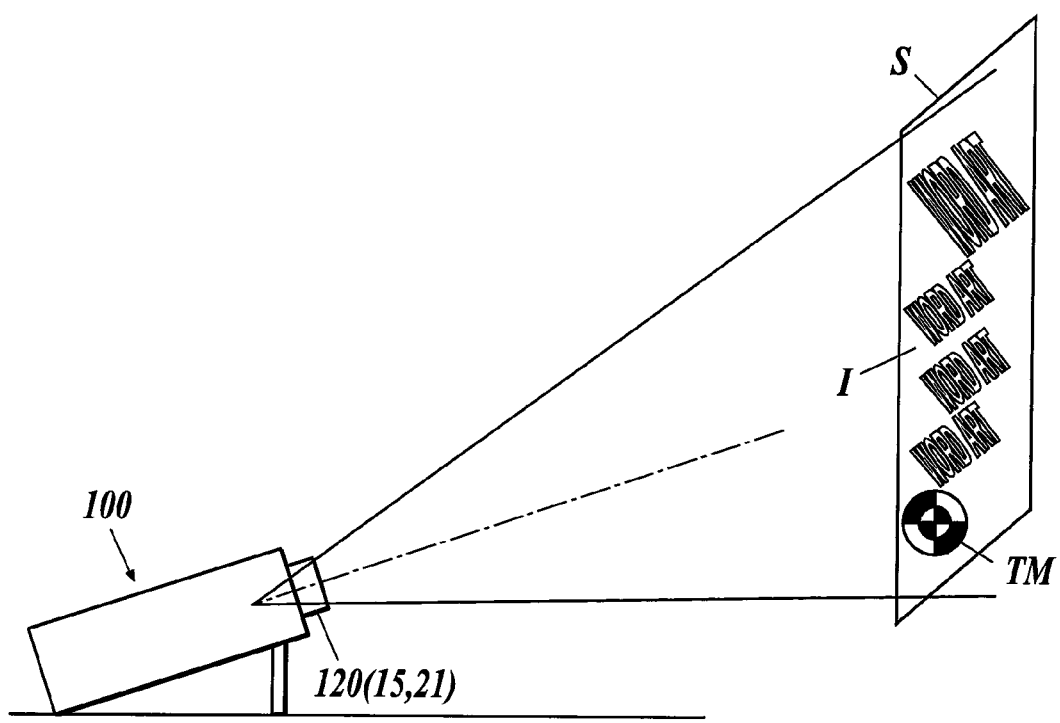
FIG. 3 is an explanatory diagram showing a state where an image is projected on a screen by the projection type projector of the embodiment.
Figure 4:
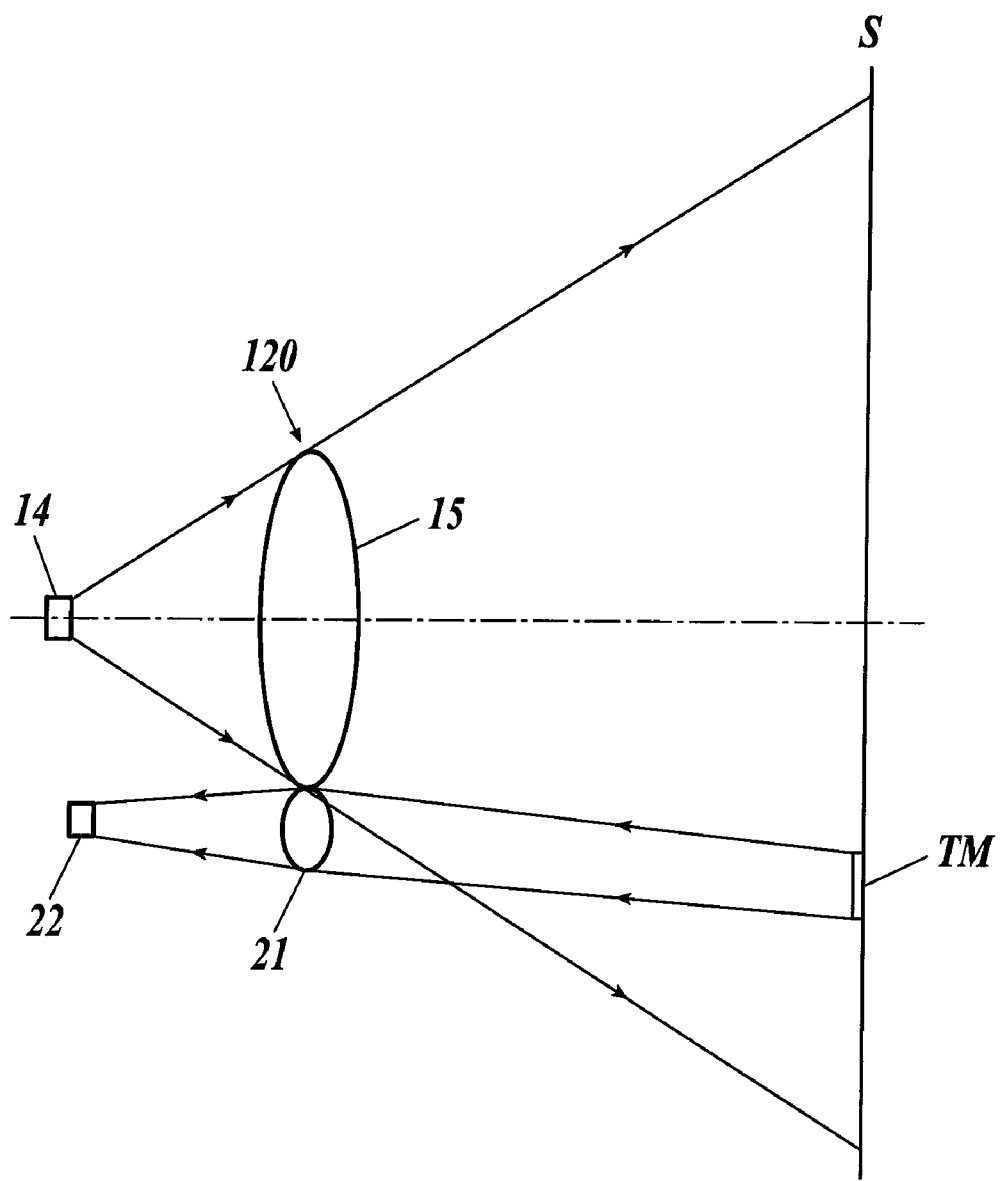
FIG. 4 is an explanatory diagram showing optical paths of an outgoing light and an incident light in a lens member.

FIG. 3 is an explanatory diagram showing an example of a case where an image I is projected on a screen S by the projection type projector 100 of the embodiment and FIG. 4 is an explanatory diagram showing the optical paths of an outgoing light and an incident light in the lens member 120 (the projector lens 15 and the photographing lens 21).

As shown in FIGS. 3 and 4, the projection type projector 100 outputs the projection light based on the image data input from outside by the image input section 4 through the projector lens 15, and thereby displays the image I on the screen S. Moreover, the projection type projector 100 projects the mark image TM for focus adjusting on the screen S, and takes in the projected image I including the mark image TM through the photographing lens 21. Then, the projection type projector 100 performs the focus adjustment of the projected image I, that is, the position adjustment of the projector lens 15, on the basis of the mark image TM which is taken in (photographing result).

Here, for example, the mark image TM is a circular shape mark in which white parts (bright parts) and black parts (dark parts) are alternately arranged. Each of the white parts and the black parts is alternately arranged in each range formed by dividing the central angle of a circle into a plurality of divisions (quadrisections) and by diving the radius of the circle into a plurality of divisions (approximately bisections), so that the total area of the white parts and the total area of the black parts may be equal to one another. For example, the image data of the mark image TM is stored in the ROM 63 in advance.

For example, a user can make the projection type projector 100 execute the focus adjustment processing of a projected image automatically by instructing the focus adjustment by the operation section 5. Hereinafter, an example of the focus adjustment processing will be briefly described.

First, when the focus adjustment processing is started, the CPU 61 transmits the image data of the mark image TM stored in the ROM 63 to the projection section 1 to make the projection section 1 project the mark image TM on the screen. Next, the CPU 61 takes in the image including the mark image TM projected on the screen S by the photographing lens 21, and picks up the image which is taken in by the image sensor 22. Then, the CPU 61 extracts the part where the mark image TM is displayed from the picked-up image, and recognizes the mark image TM.

Then, the CPU 61 calculates the area of the white parts and the area of the black parts of the mark image TM from the image data which is picked up by the image sensor 22, and operates the area ratio. Then, the CPU 61 judges whether the area ratio (ratio of the white parts and the black parts) is approximately 50:50 or not. When the area ratio is approximately 50:50, the CPU 61 judges that the projected image is in focus and ends the focus adjustment processing.

On the other hand, when the ratio of the white parts and the black parts of the mark image is off the ratio of 50:50 by a predetermined amount, the CPU 61 controls the focus drive motor 3 to displace the position of the projector lens 15 by the predetermined amount. At this time, because the projector lens 15 and the photographing lens 21 are integrally formed, the position of the photographing lens 21 is also displaced. However, because the depth of field of the photographing lens 21 is sufficiently large, the photographed image can be maintained to be in focus. That is, even when the position of the projector lens 15 is displaced in order to adjust the focus of the projected image and even when the position of the photographing lens 21 is displaced along with the displacement of the projector lens 15, the photographed image photographed through the photographing lens 21 is in focus. Therefore, whether the projected image is in focus or not can be judged on the basis of the photographing result.

As described above, the focus of the projected image is adjusted by adjusting the position of the projector lens 15 until the ratio of the white parts and the black parts becomes approximately 50:50 by repeating the processing of displacing the projector lens 15 by a very small amount and the confirmation processing of the ratio of the white parts and the black parts of the mark image TM.

According to the projection type projector 100 of the embodiment, because the focus of a projected image can be automatically adjusted by the focus adjustment processing, the troublesome for a user associated with the focus adjustment can be removed. Moreover, because the focus adjustment is performed by using the mark image TM which is actually projected from the projector lens 15, the focus adjustment processing can be performed as long as the projection of an image can be performed. That is, in the configuration of performing the focus adjustment by measuring the distance from the projection type projector to a screen, the kinds of screen to be used are limited. However, in the focus adjustment processing of the embodiment, the kinds of screen to be used are not limited.

Moreover, because the focus adjustment processing is performed by using the mark image TM which is set in advance, the image analysis processing at the time of recognizing the mark image TM from the photographed image data or at the time of judging the shifting of focus becomes easy.

The invention made by the inventor has been described in detail on the basis of an embodiment. However, the present invention is not limited to the above embodiment, and can be changed within the scope of the invention.

Figure 5:
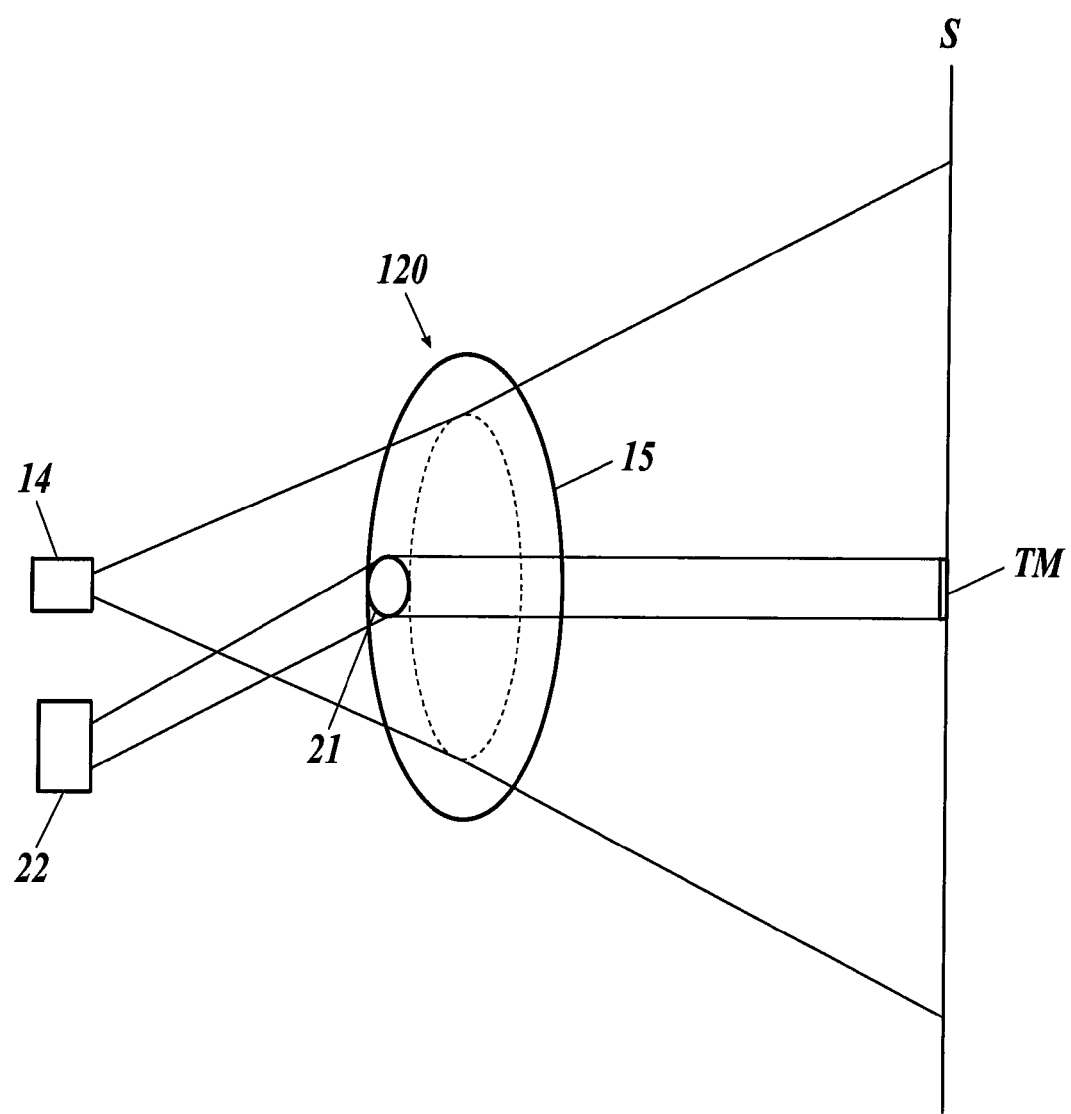
FIG. 5 is an explanatory diagram showing a modification example of the lens member.
Figure 6:
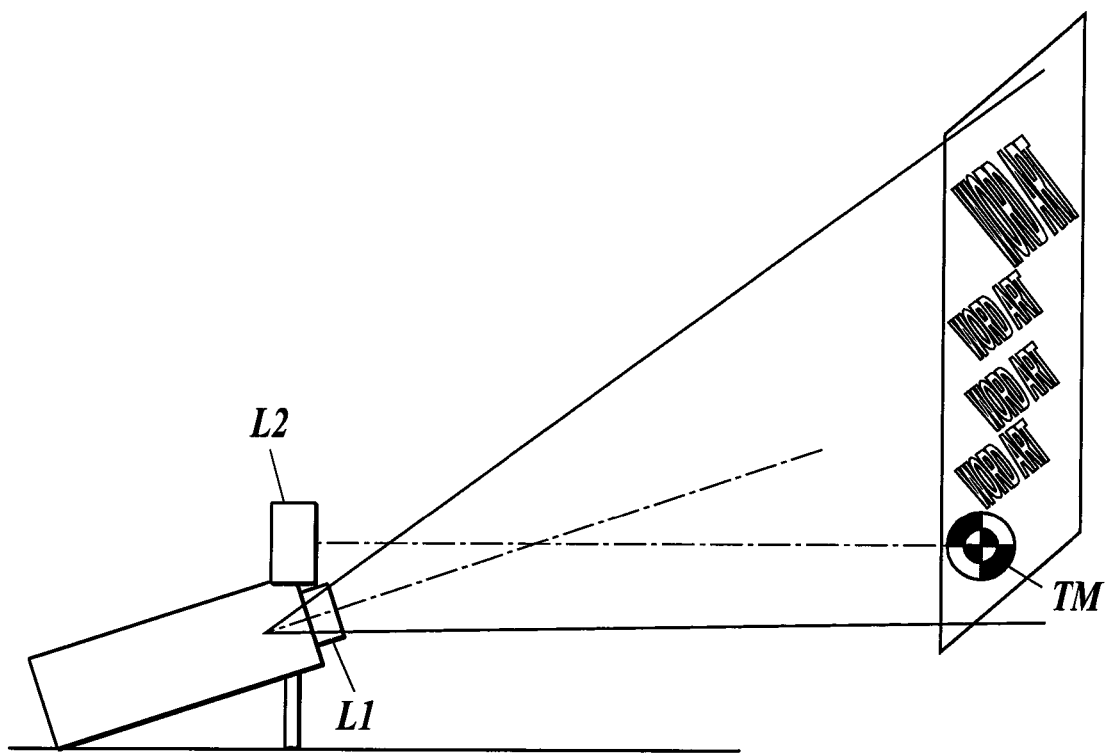
FIG. 6 is an explanatory diagram showing a state where an image is projected on a screen by a conventional projection type projector.

For example, as shown in FIG. 5, the projector lens 15 and the photographing lens 21 may be formed in different regions in the same lens so as to have the refraction factor different from one another to constitute the lens member 120. By this lens member 120, an image can be projected through the projector lens 15, and the projected image can be photographed through the photographing lens 21. Furthermore, DMD 14 and the image sensor 22 can be arranged relatively freely, and consequently the flexibility of apparatus designing becomes greater Moreover, the configuration in which the image is picked up by the image sensor 22 after changing the optical path of the light by using a reflector or the like may be adopted in place of the configuration in which the image is picked up by the image sensor 22 directly from the light entering through the photographing lens 21.

Moreover, for example, the mark image may be a mark in which bright parts and dark parts are alternately arranged in rectangles as in a checkered flag, and the other marks having various types of patterns can be used.

According to a first aspect of the preferred embodiment of the present invention, there is provided a projection type image display apparatus comprising a projection section to output a projection light in which an image is attached through a projector lens and a photographing section to photograph a projected image projected by the projection section through a photographing lens, and the projected image which is projected on a screen by the projection section is obtained by the photographing section and a focus of the projected image is adjusted based on a photographing result of the image obtained by the photographing section and the projector lens and the photographing lens are movable in a direction to change the focus of the projected image or a focus of the photographed image by a same drive section.

Preferably, the projector lens and the photographing lens are arranged in a same frame body to constitute a lens member for projecting and photographing the image.

Preferably, the projector lens and the photographing lens are formed in different regions in a same lens so as to have refraction ratios different from one another.

Preferably, the projection type image display apparatus further comprises a control section to control the projection section so as to project a mark image which is set in advance on the screen and control the photographing section so as to photograph a projected image of the mark image, and to adjust the focus of the projected image by operating the drive section so that the photographed mark image is focused.

According to a second aspect of the preferred embodiment of the present invention, there is provided a projection type image display apparatus comprising a projection section to output a projection light in which an image is attached through a projector lens, a photographing section to photograph a projected image projected by the projection section through a photographing lens, a control section to control the photographing section so as to obtain the projected image on a screen which is projected by the projection section, and the control section adjusts a focus of the projected image based on a photographing result of the image obtained by the photographing section and a drive section which can move the projector lens and the photographing lens in a direction to change the focus of the projected image or a focus of the photographed image, and the projector lens and the photographing lens are arranged in a same frame body to constitute a lens member for projecting and photographing the image and the control section controls the projection section so as to project a mark image which is set in advance on the screen and controls the photographing section so as to photograph a projected image of the mark image, and the control section operates the drive section to adjust a focus of the projected image so that the photographed mark image is in focus.

In accordance with the first and the second aspects of the present invention, the present invention has an advantage of improving the accuracy of focus adjustment and simplifying the apparatus configuration in a projection type projector equipped with a photographing section capable of photographing a projected image projected onto a screen through a projector lens to adjust the focus of the projected image with using the photographing section.

The entire disclosure of Japanese Patent Application No. 2007-135555 filed on May 22, 2007 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A projection type image display apparatus, comprising:
    a projection section to output a projection light in which an image is attached through a projector lens; and
    a photographing section to photograph a projected image projected by the projection section through a photographing lens, wherein
    the projected image which is projected on a screen by the projection section is obtained by the photographing section and a focus of the projected image is adjusted based on a photographing result of the image obtained by the photographing section, and
    the projector lens and the photographing lens are movable in a direction to change the focus of the projected image or a focus of the photographed image by a same drive section.

2. The projection type image display apparatus as claimed in claim 1, wherein the projector lens and the photographing lens are arranged in a same frame body to constitute a lens member for projecting and photographing the image.

3. The projection type image display apparatus as claimed in claim 1, wherein the projector lens and the photographing lens are formed in different regions in a same lens so as to have refraction ratios different from one another.

4. The projection type image display apparatus as claimed in claim 1, further comprising a control section to control the projection section so as to project a mark image which is set in advance on the screen and control the photographing section so as to photograph a projected image of the mark image, and to adjust the focus of the projected image by operating the drive section so that the photographed mark image is focused.

5. A projection type image display apparatus, comprising:
    a projection section to output a projection light in which an image is attached through a projector lens;
    a photographing section to photograph a projected image projected by the projection section through a photographing lens;

a control section to control the photographing section so as to obtain the projected image on a screen which is projected by the projection section, and the control section adjusts a focus of the projected image based on a photographing result of the image obtained by the photographing section; and a drive section which can move the projector lens and the photographing lens in a direction to change the focus of the projected image or a focus of the photographed image, wherein the projector lens and the photographing lens are arranged in a same frame body to constitute a lens member for projecting and photographing the image, and the control section controls the projection section so as to project a mark image which is set in advance on the screen and controls the photographing section so as to photograph a projected image of the mark image, and the control section operates the drive section to adjust a focus of the projected image so that the photographed mark image is in focus.

* * * * *